Figure 1:
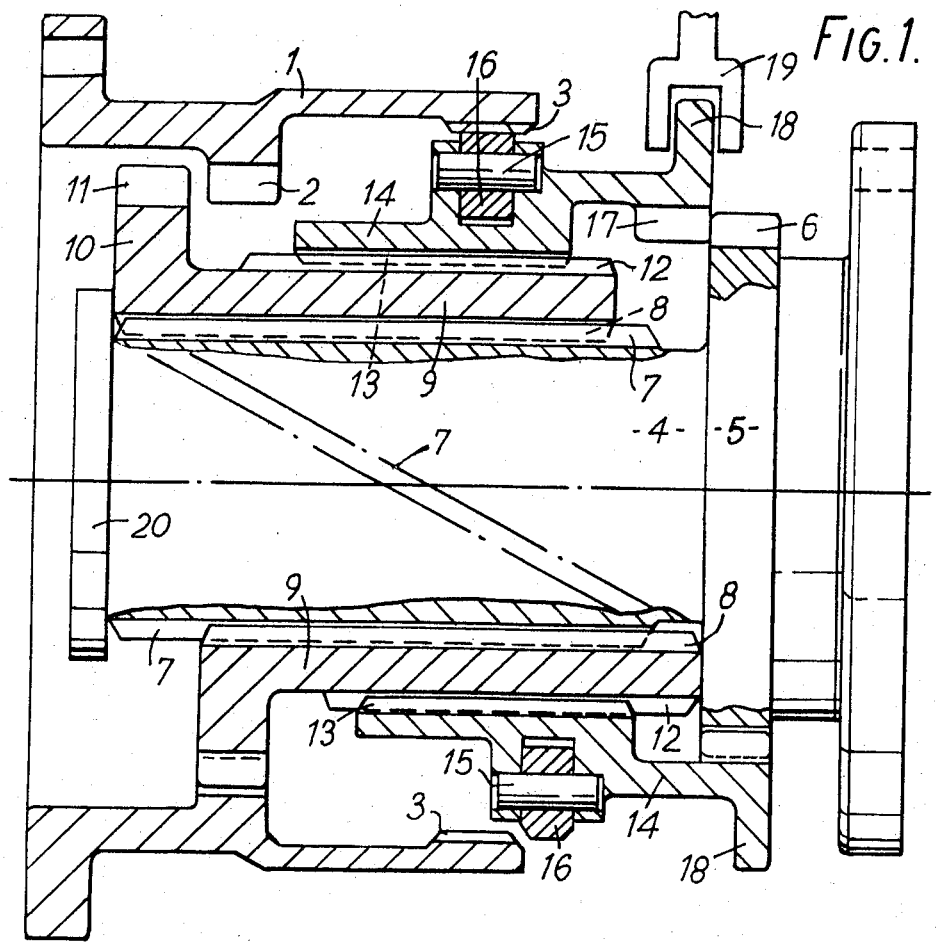

United States Patent [19]
Heybourne

[11] 3,851,740
[45] Dec. 3, 1974

[54] SYNCHRONOUS SELF-SHIFTING TOOTHED CLUTCH

[76] Inventor: Robert Howard Heybourne, 26 Ennismore Gdns., East Molesey, Surrey, England

[22] Filed: July 9, 1973

[21] Appl. No.: 377,755

[30] Foreign Application Priority Data
July 10, 1972 Great Britain.................... 32242/72

[52] U.S. Cl............................................. 192/67 A
[51] Int. Cl............................................. F16d 23/10
[58] Field of Search................................. 192/67 A

[56] References Cited
UNITED STATES PATENTS
3,620,336  11/1971  Clements et al.................. 192/67 A
3,715,019  2/1973  Heybourne et al............... 192/67 A

*Primary Examiner*—Allan D. Herrmann
*Attorney, Agent, or Firm*—Woodcock, Washburn, Kurtz & Mackiewicz

[57] ABSTRACT

A synchronous self-shifting toothed clutch of the type comprising a first rotary clutch member carrying clutch, a second rotary clutch member on which a toothed intermediate member is movable on helical splines, with pawl and ratchet mechanism for shifting the intermediate member to effect at least partial interengagement of the clutch teeth upon passage of the first and second rotary clutch members through synchronism in one direction of relative rotation.

In a conventional clutch of this type the pawls are carried by the intermediate member and the ratchet teeth are carried by the first rotary clutch member, and a pawl-free condition of the clutch is established by shifting the intermediate member relative to the second rotary clutch member. In a clutch according to the invention the pawls are carried by an auxiliary part which has a splined connection with the intermediate member, and the pawl-free condition is established by shifting the auxiliary part relative to the intermediate member.

3 Claims, 2 Drawing Figures

SYNCHRONOUS SELF-SHIFTING TOOTHED CLUTCH

This invention relates to synchronous self-shifting toothed clutches of the type comprising first and second rotary clutch members, and clutch actuating means including an intermediate member constrained for movement relative to one of said rotary clutch members, hereinafter called the second rotary clutch member, to effect at least partial interengagement of the coacting clutch teeth, with pawl and ratchet mechanism for initiating the said movement of the intermediate member upon passage of the first and second rotary clutch members through synchronism in one direction of relative rotation, the clutch when in the disengaged condition being capable of being brought to a pawl-free condition, that is to say a condition in which the pawls are incapable of ratcheting relative to the ratchet teeth or of engaging with the ratchet teeth, so that the clutch is bidirectionally free.

In a conventional clutch of the above type the elements of the pawl and ratchet mechanism, namely the pawls on the one hand and the ratchet teeth on the other hand, are normally carried respectively by the intermediate member and the first rotary clutch member, and the pawl-free condition of the clutch is established by shifting the intermediate member axially relative to the first rotary clutch member so as to effect relative axial movement of the said elements of the pawl and ratchet mechanism.

The object of the present invention is to provide a synchronous self-shifting toothed clutch of the above type wherein the pawl-free condition can be attained in a more convenient manner than in the case of a conventional synchronous self-shifting toothed clutch as referred to above.

In accordance with the invention, in a synchronous self-shifting toothed clutch of the above type one of the elements of the pawl and ratchet mechanism is carried by an auxiliary part which has a splined connection with one of said intermediate and first rotary clutch members, and which with the clutch in the disengaged condition can be shifted so as to move the element of the pawl and ratchet mechanism carried by it axially relative to the other element of the pawl and ratchet mechanism whereby to establish the pawl-free condition of the clutch.

Figure 2:
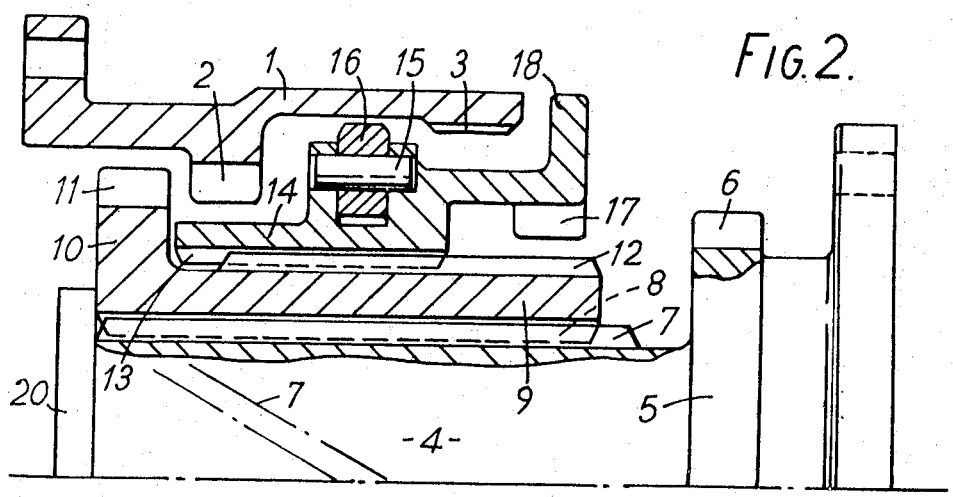

In the accompanying drawing:

FIG. 1 is a view in section on the axis of a clutch in accordance with the invention, the upper half of the Figure showing the clutch in a disengaged condition and the lower half of the Figure showing the clutch in the fully engaged and locked condition, and FIG. 2 is a half-section view showing the clutch in a pawl-free condition.

Referring to the drawing, the synchronous self-shifting toothed clutch illustrated includes a first rotary clutch member constituted by a sleeve 1, which is formed with a ring of internal clutch teeth 2 the working surfaces of which are straight. The first rotary clutch member 1 is also formed with a ring of internal ratchet teeth 3. A second rotary clutch member is constituted by a substantially cylindrical part 4 which is mounted coaxially with the first rotary clutch member 1. The second rotary clutch member 4 is formed with a radially outwardly projecting annular flange 5 which carries a ring of external locking teeth 6, and the second rotary clutch member 4 is also formed with external right-hand helical splines 7 with which engage internal helical splines 8 in an intermediate member constituted by a sleeve 9. The intermediate member 9 is formed with a radially outwardly projecting annular flange 10 which carries a ring of external clutch teeth 11, and the intermediate member 9 is also formed with external left-hand helical splines 12 with which engage internal helical splines 13 in an auxiliary part constituted by a sleeve 14. The auxiliary part 14 is formed with an annular groove across which extend pawl pins 15 on which are mounted pawls 16 the noses of which point in clockwise direction when viewed from the right-hand end of FIG. 1. The pawls 16 are provided with control springs (not shown). The auxiliary part 14 also carries a ring of internal locking teeth 17, and is formed with a radially outwardly projecting annular flange 18 engaged by a control fork 19.

The right-hand helical splines 7 and 8 that interconnect the intermediate member 9 and the second rotary clutch member 4 may, for example, have a lead angle of 30°, and the left-hand helical splines 12 and 13 that interconnect the auxiliary part 14 and the intermediate member 9 will have a smaller lead angle, of for example 10°.

In the normal disengaged condition of the clutch shown in the upper half of FIG. 1 the external clutch teeth 11 are axially disengaged from the internal clutch teeth 2, and the pawls 16 carried by the auxiliary part are axially positioned so as to be capable of ratcheting relative to the ratchet teeth 3 carried by the first rotary clutch member 1 or of engaging with the ratchet teeth 3 according to the direction of relative rotation of the first and second rotary clutch members 1 and 4. The clutch is therefore unidirectionally free. The internal locking teeth 17 carried by the auxiliary part 14 are baulked by the external locking teeth 6 carried by the second rotary clutch member 4.

Assuming that the second rotary clutch member 4 is rotating relative to the first rotary clutch member 1 in the anti-clockwise direction as seen from the right-hand end of FIG. 1, the pawls 16 ratchet relative to the ratchet teeth 3. If the direction of relative rotation of the first and second rotary clutch members 1 and 4 tends to reverse, pawls 16 engage ratchet teeth 3, and the intermediate member 9 is shifted helically to the right relative to the second rotary clutch member 4, under the action of the engaged pawls and ratchet teeth, the driving connection between the auxiliary part 14 and the intermediate member 9 constituted by the interengaged helical splines 12 and 13, and the action of the helical splines 7 and 8. The initial part of this movement of the intermediate member 9 is a helical movement which first produces initial interengagement of the clutch teeth 11 and 2 followed by flanking engagement of these clutch teeth. Thereupon the interaction of the clutch teeth 2 and 11 causes the intermediate member 9 to continue its helical motion relative to the second rotary clutch member 4 until the clutch teeth 2 and 11 are fully interengaged, at which stage the intermediate member 9 is against the flange 5 serving as an axial stop. During the said interaction of the clutch teeth 2 and 11 the difference between the lead angle, here 10°, of the helical splines 12 and 13 on the one hand and the lead angle, here 0°, of the coacting surfaces of the clutch teeth 2 and 11 causes the auxiliary part 14 to move angularly relative to the first rotary clutch member 1 such that the noses of the pawls engaged with ratchet teeth separate from these ratchet teeth and the pawl and ratchet mechanism is thereby relieved of load.

When the clutch teeth 11 have entered into full interengagement with the clutch teeth 2, the internal locking teeth 17 carried by the auxiliary part 14 are opposite gaps between the external locking teeth 6 carried by the second rotary clutch part 4. The clutch can therefore be locked in the engaged condition by operating the control fork 19 to shift the auxiliary part 14 to the right so as to engage the locking teeth 17 with the locking teeth 6. The engaged and locked condition of the clutch is shown in the lower half of FIG. 1.

In order to enable the clutch to change back to the disengaged condition shown in the upper half of FIG. 1, the clutch if locked is unlocked by operating the control fork 19 to shift the auxiliary part 14 to the left to disengage the locking teeth 17 carried by it from the locking teeth 6. When the second rotary clutch member 4 tends to rotate relative to the first rotary clutch member 1 in the anti-clockwise direction as seen from the right-hand end of FIG. 1, the interaction of the interengaged clutch teeth 2 and 11 together with the action of the helical splines 7 and 8 causes the intermediate member 9 to be shifted to the left relative to the second rotary clutch member 4 until the clutch teeth 11 have disengaged from the clutch teeth 2, at which stage the intermediate member 9 is against an axial stop 20, and the pawls 16 resume ratcheting relationship with the ratchet teeth 3.

During the above-described movements of the intermediate member 9 between its positions corresponding to clutch engagement and clutch disengagement the restraining action of the control fork 19 prevents any substantial movement of the auxiliary part 14 such as to produce relative axial movement of the pawls 16 and the ratchet teeth 3.

In order to establish a pawl-free condition of the clutch, with the clutch in the disengaged condition shown in the upper half of FIG. 1 the control fork 19 is operated to shift the auxiliary part 14 to the left relative to the intermediate member 9, so as to bring the pawls 16 carried by the auxiliary part 14 out of the position shown in the upper half of FIG. 1 into the position shown in FIG. 2, in which they are located to the left of the ratchet teeth 3 and are incapable of ratcheting with them or of engaging with them, so that the clutch is bidirectionally free. During this movement of the auxiliary part 14 the intermediate member 9 does not move relative to the second rotary clutch member 4, being against the axial stop 20.

In order to re-establish the unidirectionally free condition of the clutch, the control fork 19 is operated to shift the auxiliary part 14 to the right from the position shown in FIG. 2 to the position shown in the upper half of FIG. 1, in which the pawls 16 are again capable of ratcheting relative to the ratchet teeth 3.

Although in the above-described embodiment of the invention the working surfaces of the clutch teeth 2 and 11 are straight, that is to say they have a lead angle of 0°, the said working surfaces may, if desired, be inclined provided that their lead angle is less than the lead angle of the helical splines 12 and 13, such that during the movement of the clutch teeth 11 into full interengagement with the clutch teeth 2 the auxiliary part 14 moves angularly relative to the first rotary clutch member 1 sufficiently to remove the noses of the engaged pawls from the ratchet teeth and thereby relieve the pawl and ratchet mechanism of load.

The coacting surfaces of the locking teeth 6 and 17 preferably have the same lead angle as the splines 12 and 13 that interconnect the auxiliary part 14 and the intermediate member 9.

In a conventional synchronous self-shifting toothed clutch as referred to hereinbefore in which a pawl-free condition is established by shifting the intermediate member relative to the first rotary clutch member so as to move the pawls carried by the intermediate member axially away from the ratchet teet carried by the first rotary clutch member, the total travel of which the intermediate member must be capable is made up of its travel between the clutch engaged position and the clutch disengaged position, plus its travel between the clutch disengaged position and the pawl-free position. In a clutch according to the present invention the intermediate member has only to travel between the clutch engaged and clutch disengaged positions shown respectively in the lower and upper halves of FIG. 1, establishment of the pawl-free condition being effected by shifting the auxiliary part 14 relative to the intermediate member 9.

I claim:

1. A synchronous self-shifting toothed clutch of the type including first and second rotary clutch members, coacting clutch teeth, and clutch actuating means including an intermediate member constrained for movement relative to said second rotary clutch members to effect at leas partial interengagement of said coacting clutch teeth, with pawl and ratchet mechanism for initiating the said movement of the intermediate member upon passage of said first and second rotary clutch members through synchronism in one direction of relative rotation, said pawl and ratchet mechanism including a first element comprising pawls and a second element comprising ratchet teeth, wherein the improvement comprises an auxiliary part, means mounting one of the said elements of the pawl and ratchet mechanism on said auxiliary part, and splines connecting said auxiliary part to one of said intermediate and first rotary clutch members whereby to enable said auxiliary part, with the clutch in a disengaged condition, to be shifted to move said one element of the pawl and ratchet mechanism axially away from the other of said elements to establish a pawl-free conditon of the clutch.

2. A synchronous self-shifting toothed clutch according to claim 1, wherein the lead angle, if any, of the splines that connect said auxiliary part to one of said intermediate and first rotary clutch members is different from the lead angle, if any, of the working surfaces of said coacting clutch teeth such that relative interengaging movement of said coacting clutch teeth is accompanied by relative movement of the said elements of the pawl and ratchet mechanism about the clutch axis whereby the pawl and ratchet mechanism is relieved of load.

3. A synchronous self-shifting toothed clutch according to claim 1, including first locking teeth carried by said second rotary clutch member and second locking teeth carried by said auxiliary part, which auxiliary part can, with the clutch in an engaged condition, be shifted by virtue of said splines to interengage said first and second locking teeth whereby to lock the clutch in the engaged condition.

* * * * *